US006568353B2

United States Patent
Van Sluis

(10) Patent No.: US 6,568,353 B2
(45) Date of Patent: May 27, 2003

(54) PLAY HOUSE FOR CATS

(76) Inventor: Danny R. Van Sluis, 1855 E. Rose #7C, Orange, CA (US) 92867

( * ) Notice: Subject to any disclaimer, the term of this patent is extended or adjusted under 35 U.S.C. 154(b) by 0 days.

(21) Appl. No.: 09/855,088

(22) Filed: May 14, 2001

(65) Prior Publication Data

US 2002/0166513 A1 Nov. 14, 2002

(51) Int. Cl.⁷ .......................... A01K 15/02; A01K 29/00
(52) U.S. Cl. ........................................ 119/702; 119/707
(58) Field of Search ................... 119/702, 707, 119/708, 711; D30/160

(56) References Cited

U.S. PATENT DOCUMENTS

| 5,339,770 | A | * | 8/1994 | Haffner | 119/708 |
| 5,390,629 | A | * | 2/1995 | Simone | 119/711 |
| 5,651,332 | A | * | 7/1997 | Moore et al. | 119/708 |
| 5,870,971 | A | * | 2/1999 | Krietzman et al. | 119/707 |
| 5,875,736 | A | * | 3/1999 | Udelle et al. | 119/707 |
| D414,903 | S | * | 10/1999 | Baiera et al. | D30/160 |
| 6,098,571 | A | * | 8/2000 | Axelrod et al. | 119/707 |

* cited by examiner

Primary Examiner—Charles T. Jordan
Assistant Examiner—Elizabeth Shaw
(74) Attorney, Agent, or Firm—Willie Krawitz

(57) ABSTRACT

A playhouse for cats provides a container with numerous perforations and an interior containing various mouse and other cat toys which may be accessed through the perforations by a cat's arm. The mouse toys may include a figure atop a moveable spring, a removable mouse, one or mice on a turntable, musical and sound mice, etc. Other cat toys can include balls which rattle when moved, and toys which can emit a variety of sounds based on a battery powered sound chip. The playhouse can be used to evaluate feline aggressiveness, docility and other traits for breeding and feeding, for psychological purposes, for exercise, for coordination, to relieve boredom, etc.

10 Claims, 5 Drawing Sheets

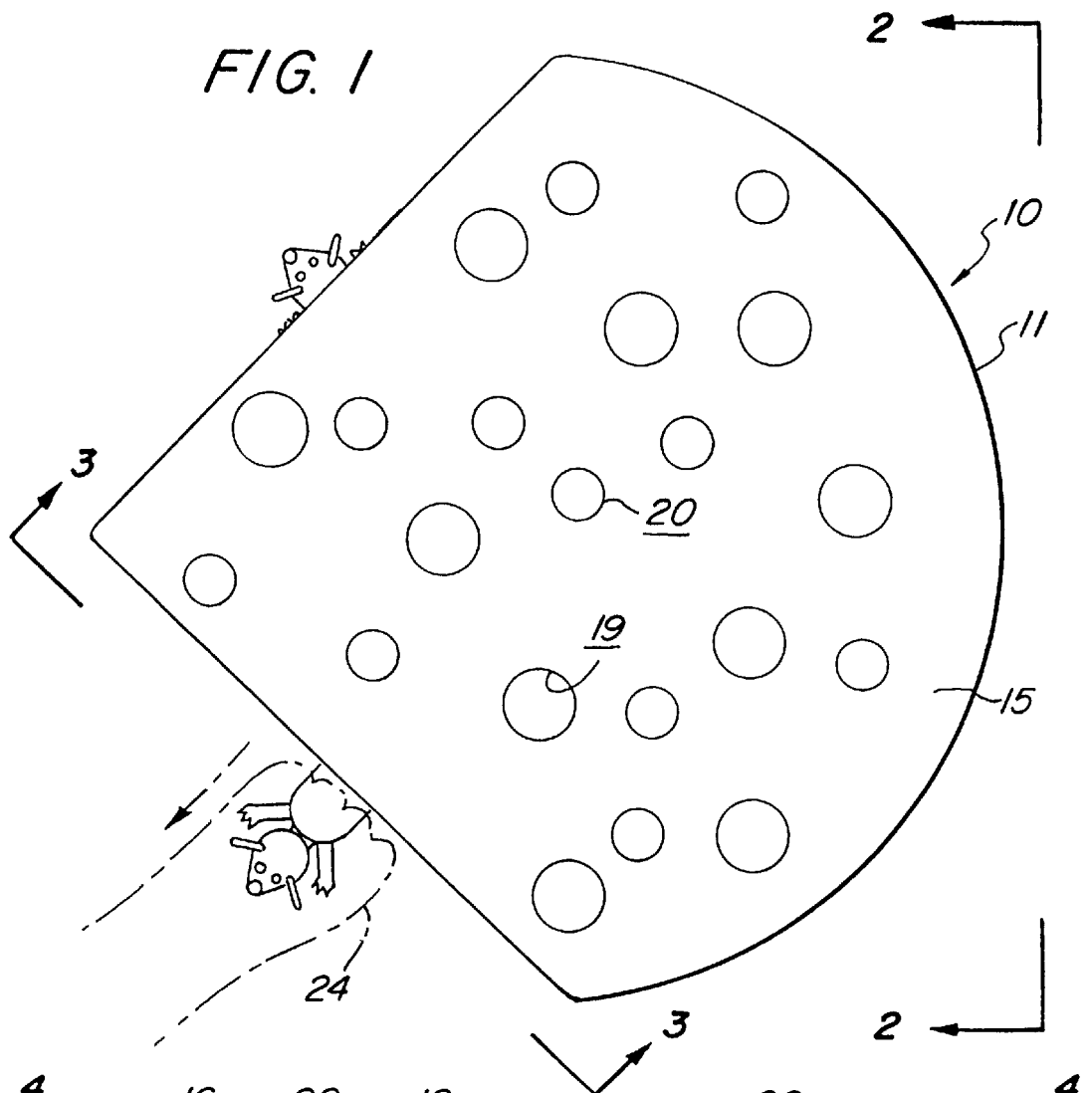
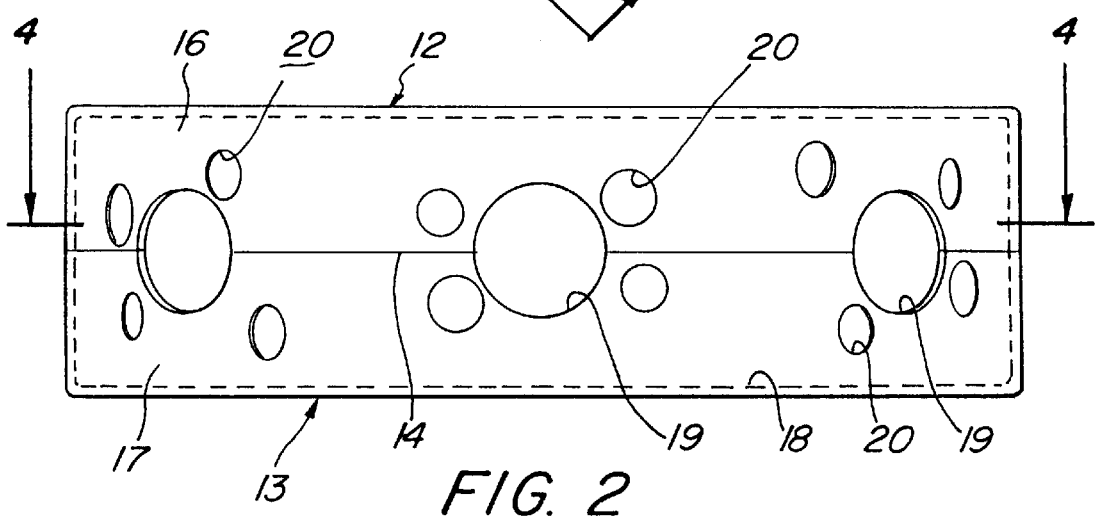

PLAY HOUSE FOR CATS

BACKGROUND OF THE INVENTION

This invention relates to a new and improved playhouse for felines. The playhouse of this invention is constructed and designed to provide exercise and entertainment, and to improve the reflexes and coordination of cats. The playhouse may enable breeders to ascertain various feline personalities and other capabilities for breeding purposes, for possible use in psychological testing, and may enable food manufacturers to determine the type of food ingredients required by a particular breed of cat based on their reactions when using the playhouse.

Various descriptions of cat and similar playhouses have been published, and these include U.S. Pat. Nos. 489,354; 797,105; 1,522,307; 4,771,732; 3,464,151; 3,552,356; 3,630,172; 4,154,018; 4,177,761; 4,841,911; 4,499,855; 4,517,922; 4,712,510; 4,720,283; 4,722,299; 4,727,825; 4,771,732; 4,841,911; 4,930,448; 4,930,448; 5,009,193; 5,269,261; 5,275,127; 5,390,629; 5,544,623 5,657,721; and, 5,673,652.

However, none of the above patents provide a playhouse which enable a cat to have a relatively long period of time for enjoyment, and for observation.

THE INVENTION

According to the invention, there is provided a feline playhouse which enables a cat to partially enter the device and play with toys mounted within the interior, while viewing the toys. If desired, the toys can be arranged so that the cat can remove a toy and avoid becoming frustrated. The playhouse of this invention enables a cat to play with the device for an extended period of time, say in the order of 2–30 minutes while still maintaining a reasonable degree of interest, and this enables a viewer to ascertain matters of personality and possibly correlate food requirements with the degree of feline activity.

The playhouse of this invention provides a multi-perforated enclosure through which a cat can extend its paw or paws and play with a toy mounted within the enclosure, while viewing the toy through other perforations. The toys can be mounted on springs or on a carousel, or can simply be unattached for playing within the enclosure, for removal from the device, etc. If desired, these toys can be constructed to produce various sounds such as by voice or sound chips, or random sounds produced for example from moving objects contained within a hollow portion of a toy, such as balls. Additionally, a toy may be located in an opening of a perforation, and is attached to the enclosure by a spring means, thereby enabling a cat to manipulate the toy without requiring the cat to enter a paw into the enclosure.

BRIEF DESCRIPTION OF THE DRAWINGS

FIG. 1 is an external plan view of the playhouse;

FIG. 2 is an end view taken along lines 2—2 of FIG. 1;

DESCRIPTION OF THE PREFERRED EMBODIMENTS

Figure 3:
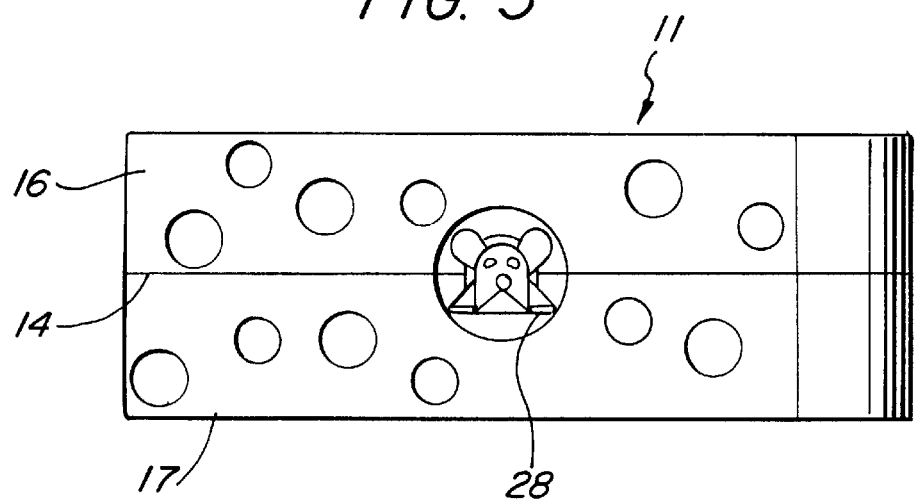
FIG. 3 is a side elevation view taken along lines 3—3 of FIG. 1.

The playhouse 10 of this invention shown in FIGS. 1–4, comprises a hollow, plastic enclosure 11 formed by an upper portion 12 and a lower portion 13 which engage each other along a line 14. The upper portion 12 defines a horizontal top 15 and side portion 16, and the lower portion 13 defines a side portion 17 and floor 18. A plurality of entry perforations 19 for a cat's paw and cat observation perforations 20 respectively are defined along the horizontal top 15 and side portions 16 and 17.

Figure 4:
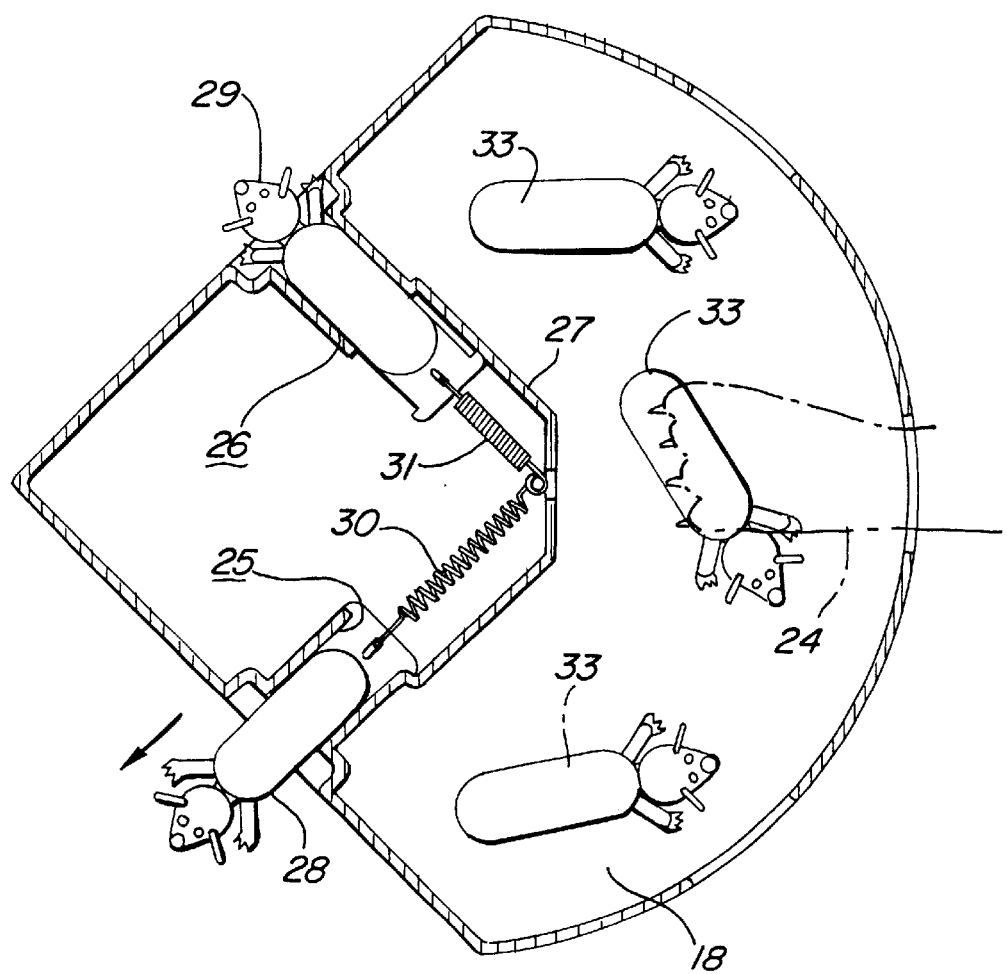
FIG. 4 is a plan view of the playhouse taken along lines 4—4 of FIG. 2, Illustrating embodiments of both horizontally spring mounted and loose toys.

As shown in FIG. 4, the enclosure is configured to define inward entry channels 25 and 26 which are additionally secured by a reinforcing wall 27. A plurality of mouse-shaped toys 28 and 29 are mounted for spring loaded movement in the direction shown by the arrow along their respective channels 25 and 26.

Springs 30, 31 secure toys 28 and 29 to reinforcing wall 27, and hence, when a cat grasps the mouse-shaped to 28, it will be pulled partly out of its entry channel 25, while the toy 29 will remain in its retracted position, as shown. A plurality of mouse-shaped toys 33 are loosely positioned on the floor for playing with by a cat's paw 24 shown in dotted designation.

Figure 5:
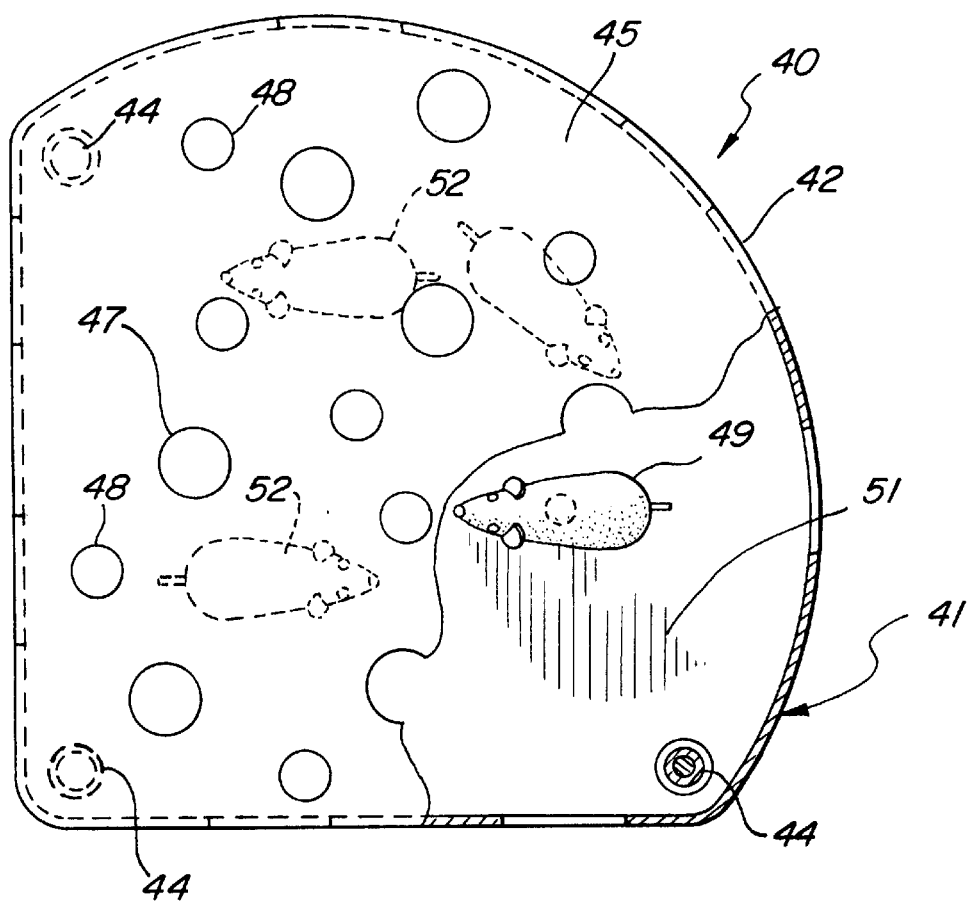
FIG. 5 is a plan view of the playhouse, partly broken away, with the playhouse cover in place illustrating both attached and unattached toy elements.
Figure 6:
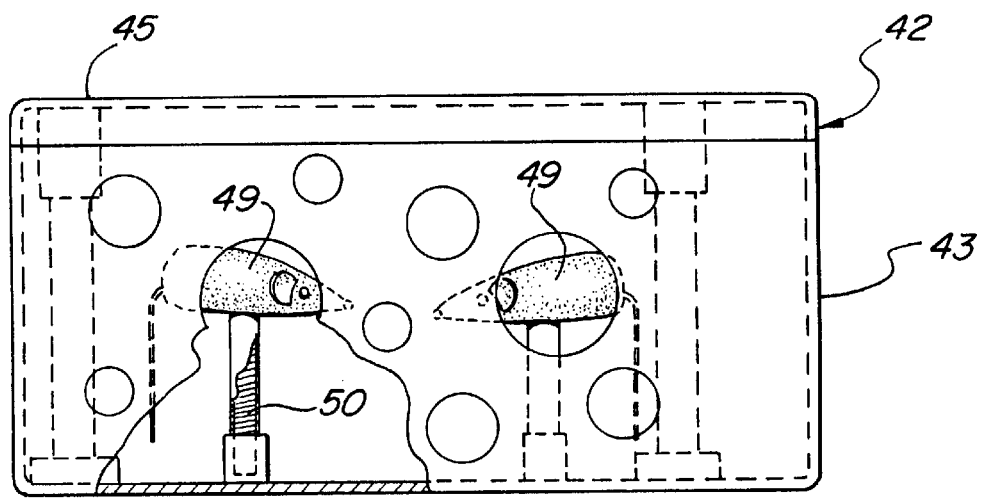
FIG. 6 is a sectional side elevation, partly broken away, showing vertically spring mounted toys.

Another embodiment of this invention is illustrated in FIGS. 5 and 6, and comprises a playhouse 40 defining a structure 41 comprising an upper portion 42 and an engaging lower portion 43 secured together by bolts 44. The upper portion 42 provides a horizontal top 45, and a plurality of cat's paw entry perforations 47 and cat viewing perforations 48 are defined on the top 45 and lower portion 43. In this embodiment, some of the mouse-shaped toys 49 are vertically mounted by springs 50 secured to the floor 51 of the playhouse, while other toys 52 are loosely arranged on the floor, and both types of toys are of course constructed and designed for access and movement by a cat's paw. The mouse-shaped toys 52 are also designed for removal from the device by the cat.

Figure 7:
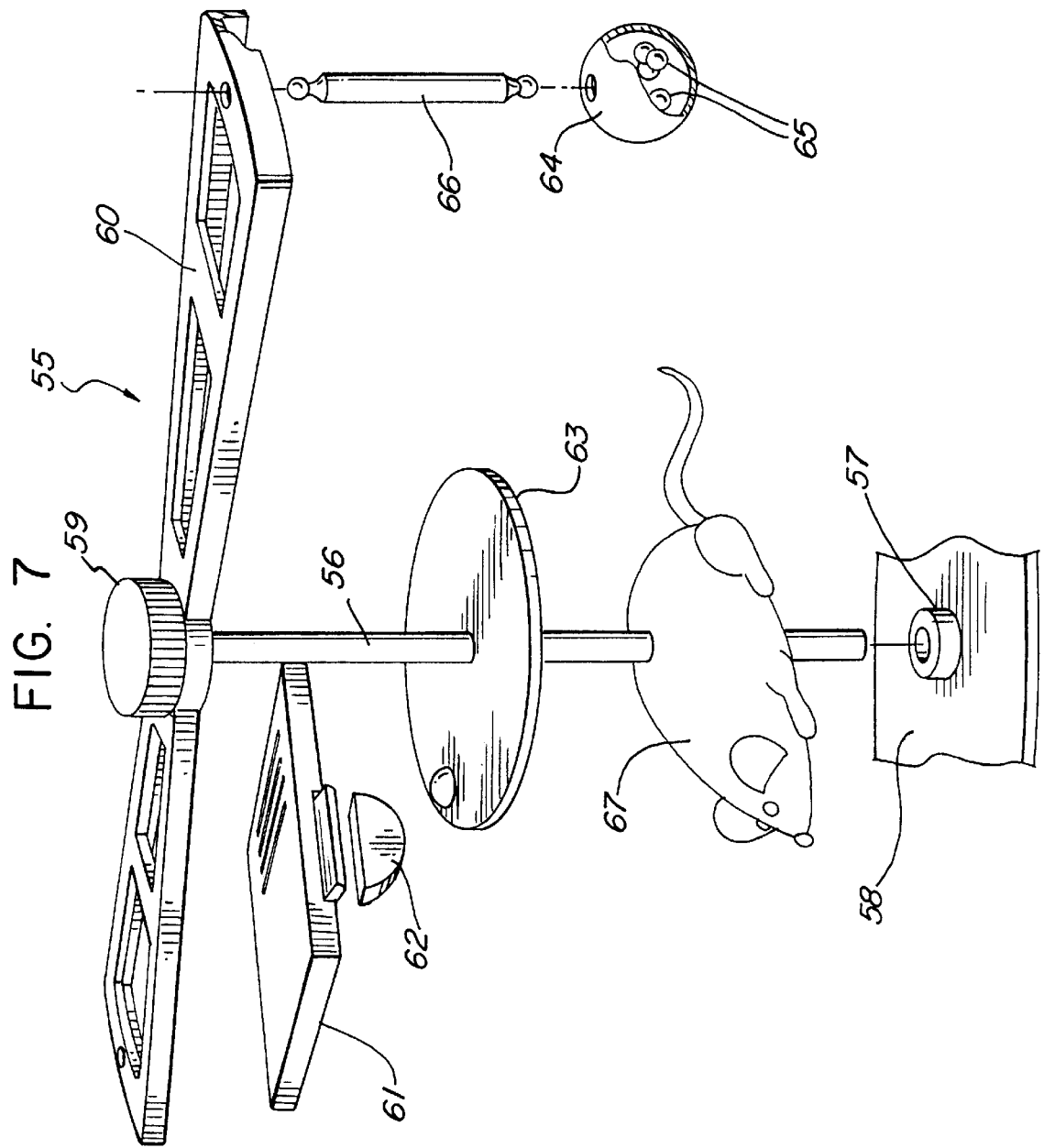
FIG. 7 is an exploded, perspective view of a carousel mounting a toy and a voice or sound chip, and hollow device which produces sound by movement of balls contained therein; and, FIG. 8 is an exploded, perspective view of another embodiment of a carousel device mounting a toy.

FIG. 7 illustrates another embodiment of the invention which employs a carousel system 55 comprising a centrally positioned, rotating mounting rod 56, the lower portion being secured within a mounting bore 57 on the floor 58 of the of the playhouse. The upper portion of the mounting rod passes through the horizontal to portion of the playhouse, and is rotatably secured thereto by a nut 59. A balancing and inertia arm 60 is mounted on and extends from the mounting rod 56 and is useful in enabling a cat to rotate the system.

A voice chip 61 and attached battery 62 is shown suitable for mounting on a platform 63 attached to the mounting rod 56. A hollow, noise-making ball 64 containing miniature sounding balls 65 is shown supported by a rod 66 attached to the inertia arm 60, and will swing freely and hence produce a sound when contacted by the balls 65 when the system is rotated. A mouse-shaped toy 67 mounted on the mounting rod 56 is designed to attract a cat who will eventually extend its paw into the playhouse and rotate the system. If desired, a toy mouse or other play item may be coated with catnip to initiate a suitable degree of interest in the toys by the cat.

Figure 8:
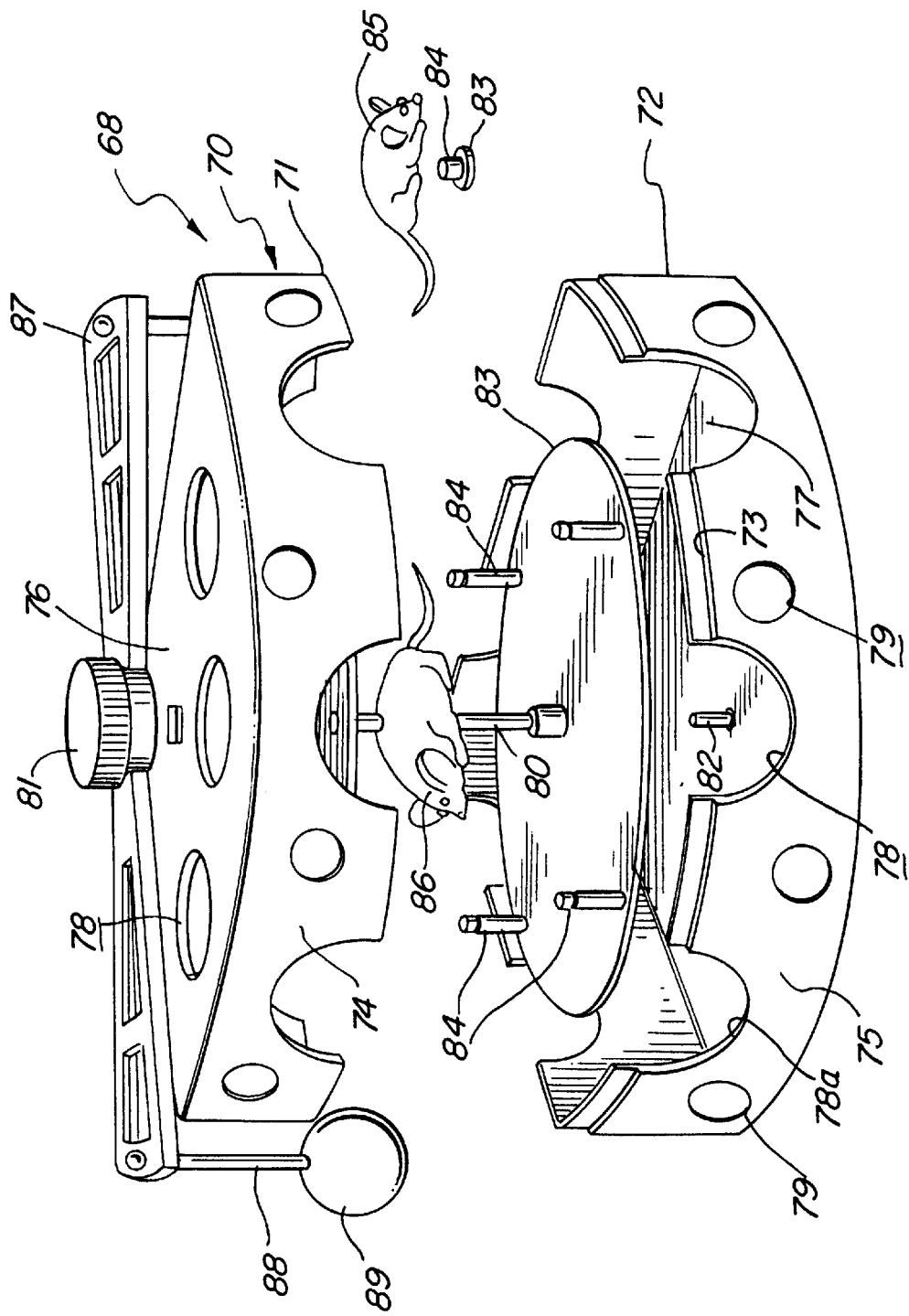

FIG. 8 shows another embodiment of a carousel system 68 of the invention and illustrates a playhouse 70 providing an upper enclosure portion 71 and lower enclosure portion 72 which will interlock along a shoulder 73 to form adjacent side areas 74 and 75 when the enclosure is completed. The upper portion 71 defines a horizontal top area 76 and the lower portion defines a floor portion 77, and both the upper and lower portions of the playhouse provide several large perforations 78, 78a for entry of a cat's paw and numerous smaller perforations 79 for viewing purposes by the cat. It will be appreciated that cat viewing may also be accomplished by viewing through the adjacent perforations 78 and 78a.

A central, rotating mounting rod 80 is secured at each end within the upper enclosure portion 71 and the lower enclosure portion 72 of the playhouse 70. The upper end of the mounting rod is secured by a nut 81 on the horizontal top area 76 and the lower end of the rod 80 is rotatably mounted along a pin 82 mounted onto the floor portion 77.

A platform 83 mounts several upright pins 84 on the periphery, and mouse-shaped toys, one toy 85 being shown as an example for mounting on the pins and, another mouse-shaped toy 86 is mounted on the rotating 80. A rotatable arm 87 for movement by the cat is secured to the upper end of the mounting rod by the nut 81, and is mounted externally of the enclosure. Noise making and balancing balls, one ball 89 being shown, are mounted at each end of the rotating arm, and they perform a function similar to the noise-making ball 67 of FIG. 7.

The playhouse of this invention provides a long lasting play activity for a cat and enables the various personalities of a cat and kittens to be evaluated, both for breeding purposes and for possible designing of better cat food ingredients.

What is claimed is:

1. A playhouse for cats, comprising an enclosure defining a plurality of perforations; at lest one play object contained in the enclosure for manipulation by a cat; the play object being viewable by the cat though one or more perforations, and enabling the cat to extend a paw through a perforation to manipulate the play object therein and coordinate manipulation of the play object when viewing through the perforation, the enclosure defining a perimeter, the play objects being partly mounted externally of the perimeter and partly within the enclosure.

2. The playhouse of claim 1, in which the play objects have associated therewith a sound mechanism which is activated by contact with the cat's paw.

3. The playhouse of claim 1, in which the play objects are mounted within the enclosure by flexible means.

4. The playhouse of claim 1, in which the play objects are mounted on a rotatable means positioned within the enclosure.

5. The playhouse of claim 4, in which the play objects are mounted on a turntable positioned within the enclosure.

6. The playhouse of claim 1, in which the play objects are removable from the playhouse by the cat.

7. The playhouse of claim 1, including a battery powered sound chip associated with a play object.

8. The playhouse of claim 1, including sound means associated with a play object and activated by movement of the play object.

9. The playhouse of claim 1, in which the play objects are coated with catnip.

10. A playhouse for cats, comprising an enclosure defining a plurality of perforations; at least one play object and an associated battery powered sound chip contained in the enclosure for manipulation by a cat; the play object being viewable by the cat through one or more perforations, and enabling the cat to extend a paw through a perforation to manipulate the play object therein and coordinate manipulation of the play object when viewing through the perforation.

* * * * *